United States Patent
Kristiansen

(10) Patent No.: US 9,049,014 B2
(45) Date of Patent: Jun. 2, 2015

(54) SUBSEA DATA COMMUNICATION SYSTEM AND METHOD

(75) Inventor: Karstein Kristiansen, Trondheim (NO)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/117,328

(22) PCT Filed: Apr. 24, 2012

(86) PCT No.: PCT/EP2012/057456
§ 371 (c)(1),
(2), (4) Date: Nov. 12, 2013

(87) PCT Pub. No.: WO2012/152574
PCT Pub. Date: Nov. 15, 2012

(65) Prior Publication Data
US 2014/0321341 A1    Oct. 30, 2014

(30) Foreign Application Priority Data

May 12, 2011 (EP) .................................. 11165917

(51) Int. Cl.
*H04L 5/14* (2006.01)
*E21B 33/035* (2006.01)
*H04B 3/54* (2006.01)
(Continued)

(52) U.S. Cl.
CPC .............. *H04L 5/14* (2013.01); *E21B 33/0355* (2013.01); *H04B 3/54* (2013.01); *E21B 47/12* (2013.01); *H04B 3/50* (2013.01)

(58) Field of Classification Search
CPC .............. H04L 5/14; H04B 3/50; H04B 3/54; E21B 47/12; E21B 33/0355
USPC ...................... 370/297, 276; 340/853.1, 853.3
See application file for complete search history.

(56) References Cited

U.S. PATENT DOCUMENTS

| 4,335,464 A | 6/1982 | Armstrong et al. |
| 4,785,448 A * | 11/1988 | Reichert et al. ............... 370/488 |
| 6,657,551 B2 | 12/2003 | Huckaba et al. |

(Continued)

FOREIGN PATENT DOCUMENTS

| CN | 1308461 A | 8/2001 |
| CN | 1615013 A | 5/2005 |

(Continued)

OTHER PUBLICATIONS

International Search Report and Written Opinion of the International Searching Authority dated Jun. 6, 2012 for corresponding PCT/EP2012/057456.
European Search Report dated Jul. 6, 2011 for corresponding EP 11 16 5917.3.
"In Control," Society for Underwater Technology, ISSN: 1752-0592, May 2008, 3 pages.

(Continued)

*Primary Examiner* — Brian D Nguyen
(74) *Attorney, Agent, or Firm* — Lempia Summerfield Katz LLC

(57) ABSTRACT

A subsea data communication system and a method of performing a data communication between a topside control system and a subsea installation are provided. The topside control system includes a topside low frequency modem adapted to perform a data communication in a first frequency range, and the subsea installation includes a subsea low frequency modem adapted to perform a data communication in the first frequency range. The topside low frequency modem is coupled to a subsea low frequency modem by a data transmission line of an umbilical that connects the topside control system to the subsea installation.

18 Claims, 4 Drawing Sheets

(51) Int. Cl.
*E21B 47/12* (2012.01)
*H04B 3/50* (2006.01)

(56) References Cited

U.S. PATENT DOCUMENTS

| | | | |
|---|---|---|---|
| 7,042,367 | B2 | 5/2006 | Gardner et al. |
| 7,261,162 | B2 | 8/2007 | Deans et al. |
| 7,760,670 | B2* | 7/2010 | Causier .................. 370/276 |
| 2002/0140572 | A1 | 10/2002 | Gardner et al. |
| 2003/0011489 | A1 | 1/2003 | Viswanathan |
| 2003/0012352 | A1* | 1/2003 | Kiykioglu et al. ....... 379/114.01 |
| 2005/0172327 | A1* | 8/2005 | Kay ............................ 725/127 |
| 2006/0055555 | A1 | 3/2006 | Causier |
| 2010/0284453 | A1* | 11/2010 | Brekke et al. ................. 375/222 |
| 2011/0096778 | A1* | 4/2011 | Binder .......................... 370/389 |
| 2011/0110319 | A1* | 5/2011 | Fukuoka et al. .............. 370/329 |
| 2011/0169579 | A1* | 7/2011 | Dodrill ............................ 331/46 |
| 2011/0199920 | A1* | 8/2011 | Takei et al. ................... 370/252 |
| 2011/0261732 | A1* | 10/2011 | Tanno et al. .................. 370/281 |
| 2012/0243526 | A1* | 9/2012 | Yamamoto et al. ........... 370/343 |

FOREIGN PATENT DOCUMENTS

| | | | |
|---|---|---|---|
| CN | 1878109 | A | 12/2006 |
| GB | 2 352 376 | A | 1/2001 |
| GB | 2417656 | A | 3/2006 |
| WO | WO 2008/011889 | A1 | 1/2008 |

OTHER PUBLICATIONS

Weatherford, "Subsea Production Solutions," 2010, 15 pages.
Birnie, "Retrofit Increased Instrumentation on Mature Fields," Conference Papers, CMR, Fantoftvegen 38, Bergen, Aker Solutions, Jun. 18, 2009, 45 pages.
Ferreira, et al., "Power Line Communications: Theory and Applications for Narrowband and Broadband Communications Over Power Lines," Wiley-Blackwell, Jun. 11, 2010, 4 pages.
Halmoy, "SmartControls (TM) for Smart Subsea Fields," Offshore Mediterranean Conference and Exhibition, Conference Papers, Mar. 2001, 13 pages.
McCord, "A Multiplex System for a Small Remotely Manned Submersible," IEEE Ocean '75 Conference, Sep. 1975, pp. 361-364.
Smith, Hughes Electrical Engineering Technology, Prentice Hall, 7th Ed., Feb. 20, 1995, 5 pages.
Stallion, "Mature Assets: More data from mature offshore fields," E&P Magazine, Aug. 2008, 3 pages.
Notice of Opposition to European Patent for corresponding EP 11165917.3, opponent Proserv UK Ltd., Jun. 18, 2014.
Notice of Opposition to European Patent for corresponding EP 11165917.3, opponent GE Oil & Gas UK Limited, Jun. 18, 2014.
Notice of Opposition to European Patent for corresponding EP 11165917.3, opponent FMC Kongsberg Subsea AS, Jun. 18, 2014.
Chinese Office Action dated Jul. 24, 2014 for corresponding Chinese Patent Application No. 201280022890.5 with English translation.

* cited by examiner

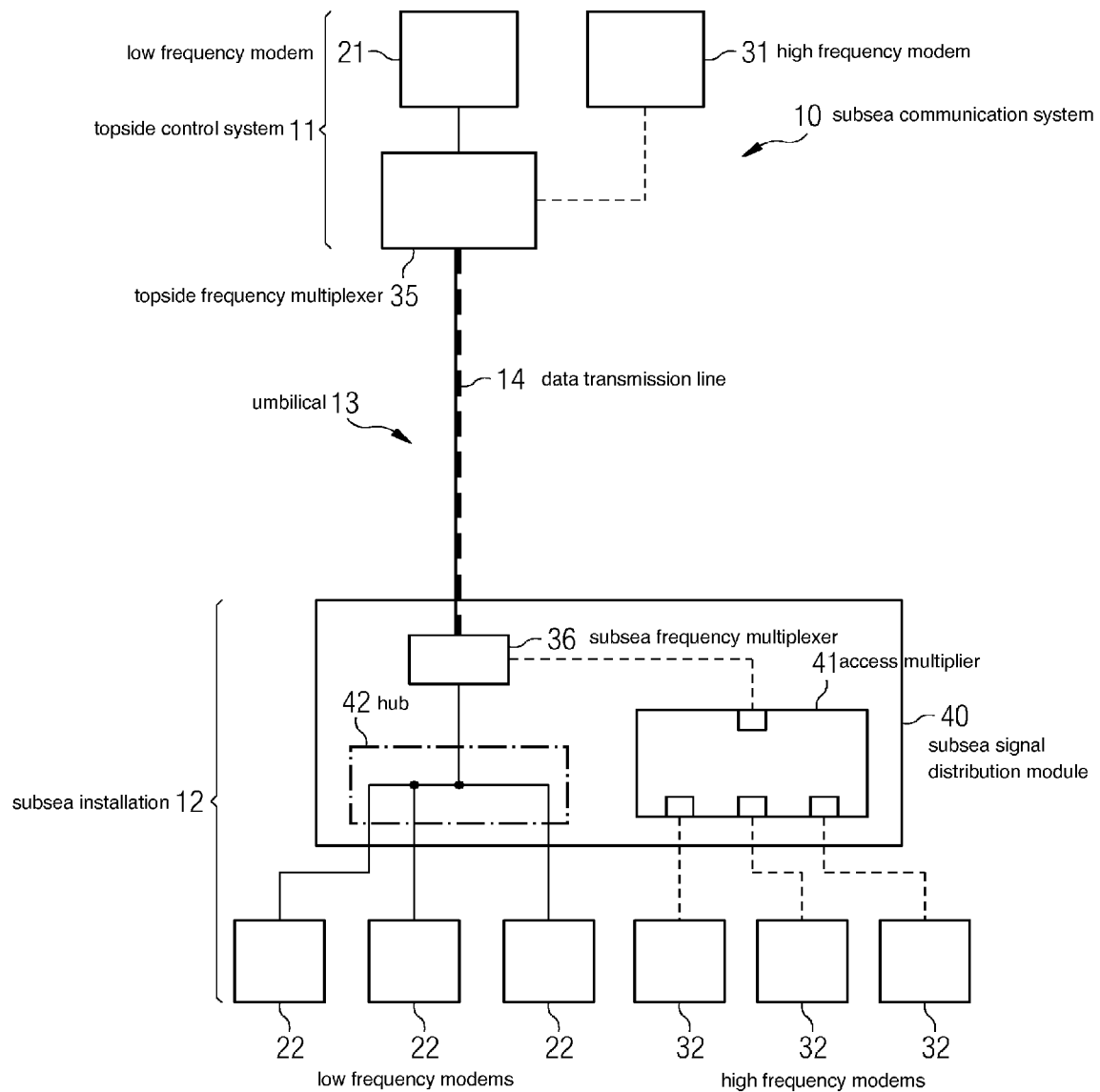

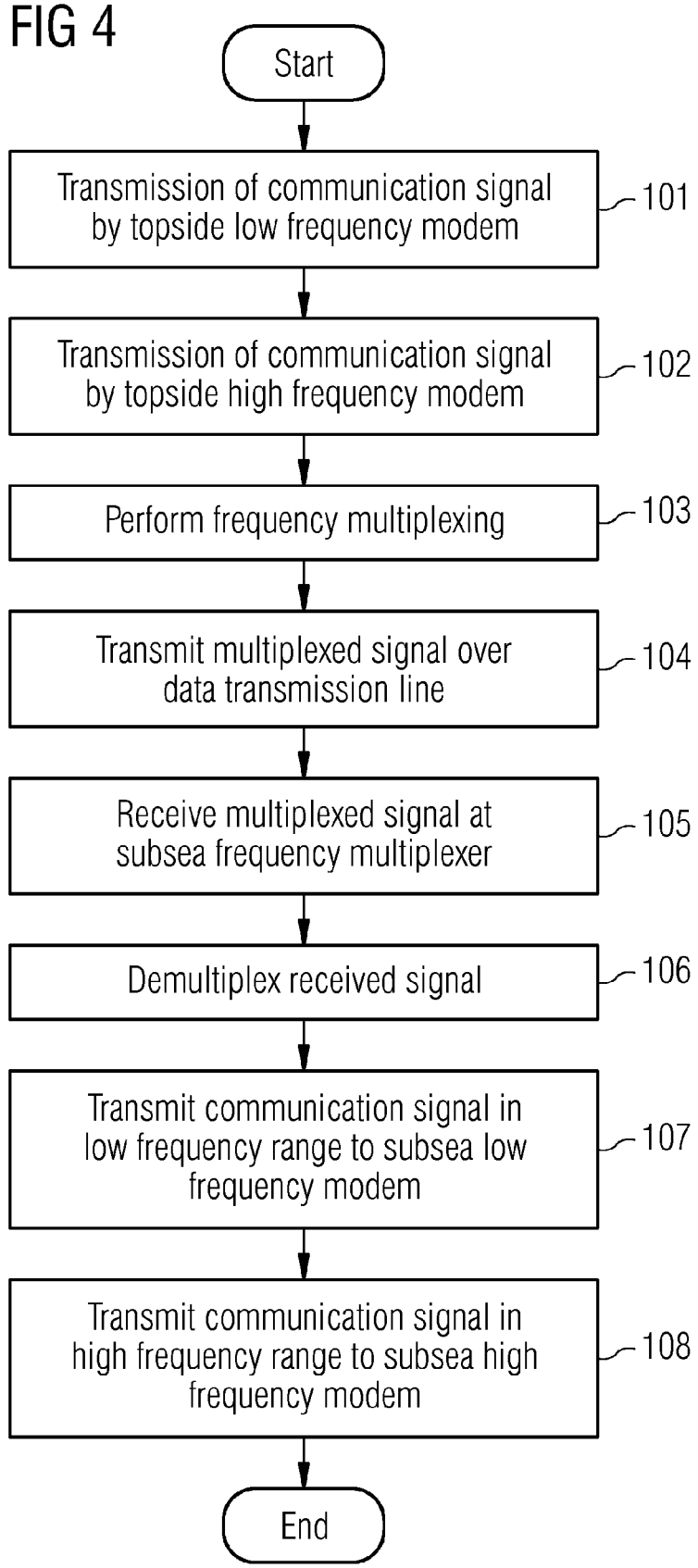

SUBSEA DATA COMMUNICATION SYSTEM AND METHOD

The present patent document is a §371 nationalization of PCT Application Ser. No. PCT/EP2012/057456, filed Apr. 24, 2012, designating the United States, which is hereby incorporated by reference. This patent document also claims the benefit of EP 11165917.3, filed on May 12, 2011, which is also hereby incorporated by reference.

FILED

The present embodiments relate to providing a data communication between a topside control system and a subsea installation.

BACKGROUND

Oil platforms may be used in offshore oil and gas production. In the operation of offshore oil platforms, electronic equipment may be installed under water (e.g., for controlling functions of a subsea Christmas tree or a subsea blowout preventer). More recently, subsea processing facilities are being established in which processing equipment such as electrically driven pumps and gas compressors are relocated to the ocean floor. Subsea processing facilities may be provided with a power grid as well as control, monitoring and communication systems.

In both of these examples, a subsea installation is provided at the ocean floor. The subsea installation includes electronic equipment that may be monitored and/or controlled by a topside control system that may be based on a marine vessel (e.g., a ship or a platform) or may be based onshore. The subsea installation may, for example, include a Well Control Module (WCM) or a Manifold Control Module (MCM).

In a conventional system, the communication between the topside control system and such module of the subsea installation may be based on the AFSK (Audio Frequency Shift Keying) modem standard, such as Bell 202. By using a Bell 202 modem at the topside control system and another Bell 202 modem at the subsea installation that is connected to the respective module, a data transfer rate of about 1200 Boud at half duplex may be achieved. If several Bell 202 subsea modems are connected to the topside modem, a data transfer rate of 1200 Boud divided by the number of subsea modems may be achieved for each subsea modem. The data transfer is thus rather slow and may not be easily upgraded.

There is an increased demand for monitoring and controlling subsea installations, which requires higher bandwidth for transferring the data of sensors and control signals between the subsea and the topside installations. Updating the existing infrastructure (e.g., modems on the subsea control modules and data lines in the umbilical) is very costly process.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved subsea communication system that enables a data communication with a higher bandwidth and may be implemented cost efficiently is provided.

According to an aspect, a subsea data communication system for providing a data communication between a topside control system and a subsea installation is provided. The topside control system includes a topside low frequency modem adapted to perform a data communication in a first frequency range, and the subsea installation includes a subsea low frequency modem adapted to perform a data communication in the first frequency range. The topside low frequency modem is coupled to the subsea frequency modem by a data transmission line of an umbilical that connects the topside control system to the subsea installation. The subsea data communication system includes a topside high frequency modem adapted to be arranged at the topside control system and to perform a data communication in a second frequency range, and a subsea high frequency modem adapted to be arranged at the subsea installation and to perform a data communication in the second frequency range. The second frequency range is higher than the first frequency range. The subsea data communication system further includes a topside frequency multiplexer adapted to couple the topside low frequency modem and the topside high frequency modem to the data transmission line, and a subsea frequency multiplexer adapted to couple the subsea low frequency modem and the subsea high frequency modem to a data transmission line. The topside and the subsea frequency multiplexers are configured so as to enable a simultaneous data communication between the topside and subsea low frequency modems in the first frequency range and between the topside and subsea high frequency modems in the second frequency range over the data transmission line.

The use of a second higher frequency range for data communication may enable a data communication with a higher data transfer rate. As the data communication in the second frequency range makes use of the same data transmission line as the communication in the first lower frequency range, the subsea data communication system may be implemented with an existing umbilical. The costs for upgrading an existing data communication system may thus be reduced. Modules of the subsea installation that make use of such low frequency modems do not need to be replaced. The modules may continue to operate. This also decreases the costs of implementing the subsea data communication system in an existing subsea infrastructure.

The subsea data communication system may thus be used to increase the date communication bandwidth in a conventional system without disturbing the conventional system (e.g., the subsea data communication system may co-exist with a conventional system). The subsea data communication system may enable a stepwise upgrading of the subsea installation (e.g., by subsequently exchanging modules using communication in the lower frequency range with modules having a high frequency modem).

Communication does not need to take place over the whole respective frequency range, but may occur in a frequency band lying in the respective frequency range. The low frequency modem and the high frequency modem may also be termed first modem and second modem, respectively.

In an embodiment, the first frequency range and the second frequency range are configured such that the first frequency range and the second frequency range do not overlap. The first frequency range may, for example, lie below a threshold frequency, and the second frequency range may lie above this threshold frequency. The threshold frequency may be in a range of about 10 kHz to about 150 kHz. An interference of the communication signals in the different frequency ranges may thus be avoided.

The first frequency range may, for example, be a range of about 1 kHz to about 5 kHz. The second frequency range may, for example, be a range of about 50 kHz to about 10 MHz. By making use of frequencies lying in the second frequency range, the high frequency modems may perform a data communication with high data transfer rates.

In an embodiment, the frequency multiplexer is a diplexer. Other configurations in which further frequency ranges are multiplexed onto the data transmission line may also be provided.

The diplexer may be a passive diplexer. As such, the diplexer does not require electric power to be operated.

Each frequency multiplexer may be adapted to multiplex data communication signals received from the respective low frequency modem and the respective high frequency modem onto the data communication line. Each frequency multiplexer may also be adapted to demultiplex a communication signal received on the data communication line into a communication signal in the first frequency range to be transmitted to the respective low frequency modem, and a communication signal in the second frequency range to be transmitted to the respective high frequency modem. By making use of the different frequency ranges, the frequency multiplexer may thus combine signals received from the connected modems and split signals received on the data communication line such that each modem is supplied with the signal of the respective communication frequency range.

In an embodiment, each frequency multiplexer includes a first interface to the respective low frequency modem, a second interface towards the respective high frequency modem and a third interface towards the data transmission line. The frequency multiplexer further includes a low pass filter or a band pass filter adapted to pass frequencies of the first frequency range and connected between the first interface and the third interface. The frequency multiplexer also includes a high pass filter or a band pass filter adapted to pass frequencies of the second frequency range and connected between the second interface and the third interface. Such filters may be implemented as passive elements and may allow an effective multiplexing or demultiplexing of a communication signal.

In a further embodiment, the topside and the subsea high frequency modems are adapted to perform a data communication with each other using an orthogonal frequency-division multiplexing (OFDM) scheme. Such communication scheme may use a frequency band to transmit data and achieves high data transmission rates.

The topside and the subsea high frequency modems may, for example, be adapted to use a frequency band lying within a range of about 50 kHz to about 10 MHz for the communication. The frequency band is divided into frequency multiplexed channels. Each channel has a predetermined frequency bandwidth. The bandwidth for each channel may, for example, be about 3 to 5 kHz. A total of 100 to 300 channels may be provided. Using such scheme has the advantage that if a particular channel becomes affected by interference or the like, the other channels may still be used for data transmission, thus keeping the transmission rate up. Data transmission rates above 0.5 megabits per second (Mbps) or even above 1 Mb/s may thus be achieved using the high frequency modems.

In a further embodiment, the subsea communication system further includes subsea signal distribution module coupled to the data communication line. The subsea low frequency modem and at least one further subsea low frequency modem are coupled to the subsea signal distribution module. The low frequency modems may implement a multi drop communication scheme for enabling a data communication between the topside low frequency modem and each of the subsea low frequency modems. Accordingly, by using only one topside modem and one data communication line, several control modules coupled to the subsea low frequency modems may be communicated with. The frequency multiplexer may be part of the subsea signal distribution module, or may be coupled between the subsea signal distribution module and the data communication line.

In a further embodiment, the subsea communication system further includes a subsea signal distribution module coupled to the data communication line. The subsea high frequency modem and at least one further subsea high frequency modem are coupled to the subsea signal distribution module. The subsea signal distribution module may include an access multiplier adapted to enable a point to point communication between the topside high frequency modem and each of the subsea high frequency modems. Accordingly, using one topside high frequency modem and a single data communication line, a plurality of point to point connections to subsea high frequency modems that may allow a data communication with a plurality of control modules of the subsea installation connected thereto may be provided. This is advantageous, as due to the high data transfer rates achieved with the high frequency modems over the umbilical, larger amounts of data may be transferred to or from the individual control modules without the presence of more subsea high frequency modems leading to a considerable delay. Again, the frequency multiplexer may be part of the subsea signal distribution module or may be coupled between the subsea distribution module and the data communication line.

In one embodiment, both of the subsea signal distribution modules mentioned above (e.g., in a single subsea signal distribution module) may be combined, and a data communication with several subsea low frequency modems and subsea high frequency modems may thus be enabled.

In an embodiment, the subsea high frequency modem is connected to the well control module (WCM) or a manifold control module (MCM), or is part thereof. The subsea high frequency modem is configured to provide data received over the data communication line to the well control module or the manifold control module, respectively.

Similarly, the subsea low frequency modem may be coupled to or may be part of a MCM or a WCM. The low frequency modems may also be configured to communicate using an Audio Frequency Shift Keying (AFSK) communication scheme. The topside and the subsea low frequency modems may, for example, be bell 202 modems.

In same embodiments, the subsea data communication system may include any of the above-mentioned components, such as the subsea/topside low frequency modems, the data transmission line, a WCM or MCM or the like.

A further aspect provides a method of performing a data communication between a topside control system and a subsea installation. The topside control system includes a topside low frequency modem. The subsea installation includes a subsea low frequency modem. The topside low frequency modem is coupled to the subsea low frequency modem by a data transmission line of an umbilical that connects the topside control system to the subsea installation. The method includes performing a data communication between the topside and the subsea low frequency modems in a first frequency range and performing a data communication between a topside high frequency modem arranged at the topside control system and a subsea high frequency modem arranged at the subsea installation in a second frequency range. The second frequency range is higher than the first frequency range. The topside low frequency modem and the topside high frequency modem are coupled to the data transmission line by a topside frequency multiplexer, and the subsea low frequency modem and the subsea high frequency modem are coupled to the data transmission line by a subsea frequency multiplexer. The method further includes performing frequency multiplexing and demultiplexing by each of the topside and subsea frequency multiplexers so as to enable simultaneous data communication between the topside and subsea low frequency modems in the first frequency range and between the topside and subsea high frequency modems in the second frequency range over the data transmission line.

With the method, advantages similar to the advantages outlined above with respect to the subsea data communication system may be achieved.

In an embodiment, the method is performed by a subsea communication system configured as mentioned above (e.g., configured in accordance with any of the aspects and embodiments mentioned above with respect to the subsea data communication system).

The frequency multiplexer mentioned in the method may, for example, be configured as outlined further above. Similarly, the frequency ranges mentioned in the method may be configured as mentioned above. Also, the method may be performed in a system that includes a subsea signal distribution module coupled to either several subsea low frequency modems or several subsea high frequency modems or both in the respective configurations, as outlined above.

The features of the aspects and embodiments mentioned above and those to be explained below may be combined with each other unless noted to the contrary.

BRIEF DESCRIPTION OF THE DRAWINGS

In the drawings, like reference numerals refer to like elements.

FIG. 3 is a schematic block diagram illustrating an embodiment of a subsea data communication system including a subsea signal distribution module towards which a plurality of subsea low frequency modems and a plurality of subsea high frequency modems are coupled; and FIG. 4 is a flow diagram illustrating one embodiment of a method according.

DETAILED DESCRIPTION

Figure 1:
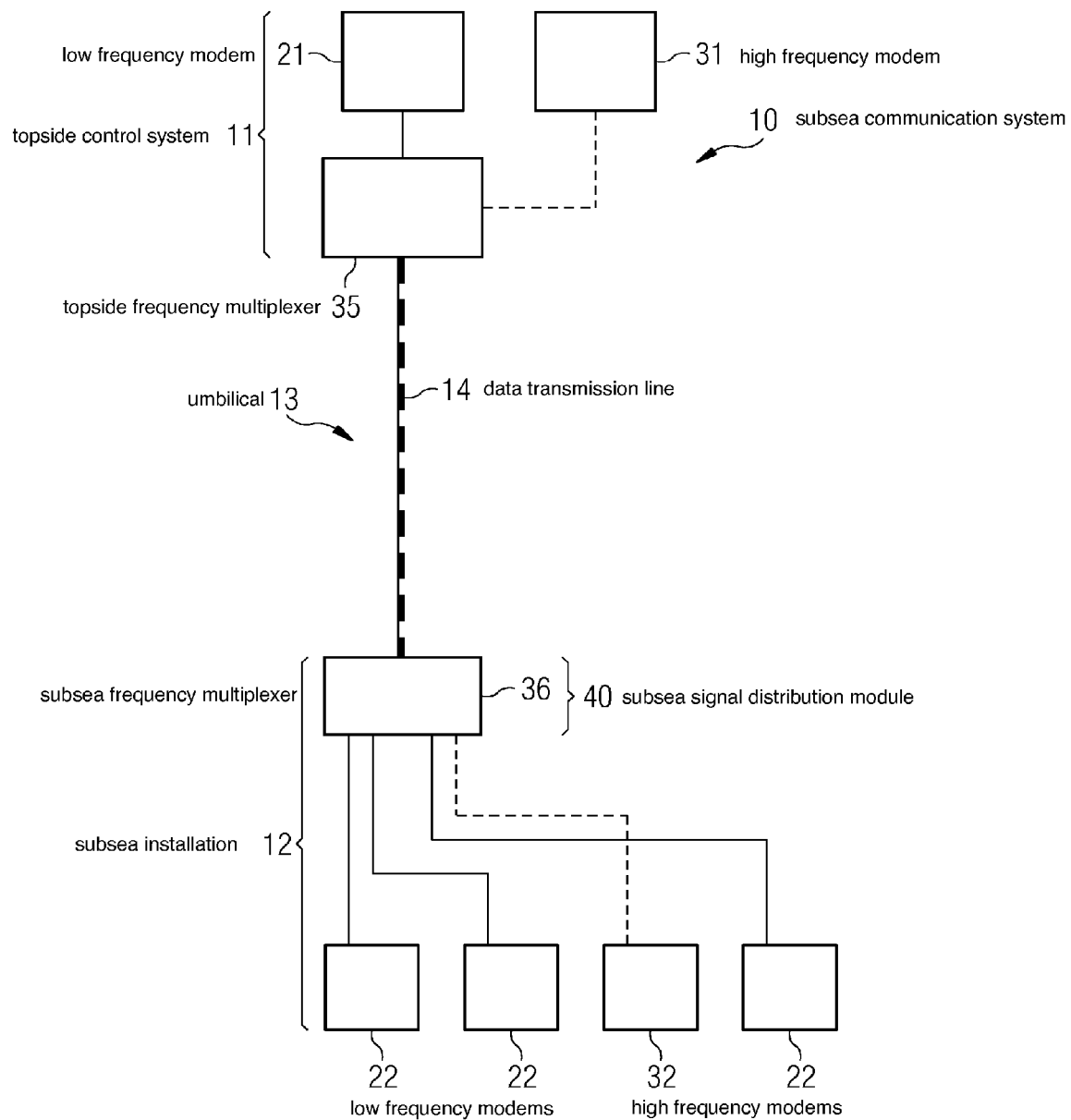
FIG. 1 is a schematic block diagram illustrating a subsea data communication system according to an embodiment.

In the following, the embodiments illustrated in the accompanying drawings are described in more detail. The following description is only illustrated non-restrictive. The drawings are only schematic representations, and elements in the drawings and not necessarily to scale with each other. The embodiment may include further components that are not illustrated in the drawings. Couplings between elements illustrated in the drawings may also be indirect couplings (e.g., a couplings with one or more intervening elements).

FIG. 1 illustrates a subsea communication system 10 according to an embodiment. The subsea communication system 10 may be used for upgrading existing subsea communication systems.

In the example of FIG. 1, a topside control system 11 is, using an umbilical 13, coupled to a subsea installation 12. The topside control system 11 may include one or more data processing systems, such as computers (not shown) that receive data from the subsea installation 12 or that issue control commands to the subsea installation. The topside control system 11 may, for example, be installed on a marine vessel such as a drill ship or an oil platform, or the topside control system 11 may be installed at an onshore site. For performing a data communication with the subsea installation 12, the topside control system 11 includes a first modem 21 (e.g., a low frequency modem). The topside modem 21 may, for example, operate according to the AFSK standard. The topside modem 21 receives digital signals from a data processing unit and performs a modulation of an analog signal in accordance with the digital data in order to transmit the digital data.

The subsea installation 12 may be part of a well head assembly, a subsea production device or the like. The subsea installation 12 includes first subsea modems 22 (e.g., low frequency modems) that may, for example, be in communication with a well control module (WCM) or manifold control module (MCM). In the example illustrated in FIG. 1, the subsea installation 12 includes three subsea low frequency modems 22 that are coupled to a signal distribution module 40. The topside low frequency modem 21 communicates with one or each of the subsea lower frequency modems 22 by transmitting a modulated signal over a data transmission line 14 included in the umbilical 13. The data transmission line 14 is a physical line such as a copper line dedicated to the data transmission. In other embodiments, the data transmission line 14 may be used to perform further functions in the umbilical 13.

The modems 21 and 22 are termed "low frequency" modems, as the modems 21 and 22 communicate with each other by using a frequency range that is lower than the frequency range used by second modems 31 and 32 (e.g., high frequency modems) for communication. The second modems 21 and 22 may operate according to the AFSK standard (e.g., to a standard called bell 202). The second modems 21 and 22 may, for example, use a 1200 Hz tone for mark (e.g., a binary one) and a 2200 Hz tone for space (e.g., a binary zero). In such a configuration, the data transfer rate between a single topside low frequency modem 21 and a single subsea low frequency modem 22 may lie in a range between 1000 and 5000 Baud (e.g., at 1200 Baud and half duplex). As the data communication for all low frequency modems 22 runs over the same data transmission line 14, the data transmission rate decreases for an increased number of installed subsea low frequency modems 22. By coupling, for example, 10 low frequency modems 22 to the data transmission line 14 for controlling a corresponding number of WCM or MCM units, each of these units may only communicate with the topside control center at a data throughput of 120 Baud. This is a rather low bandwidth that results in an increased amount of time required for uploading data or for receiving control commands at the subsea installation 12.

When installing new units, such as WCM and MCM units, the bandwidth of the data transfer may be increased. In the embodiment of FIG. 1, a subsea communication system 10 that includes a topside high frequency modem 31 at the topside control center 11 and a subsea high frequency modem 32 at the subsea installation 12 is thus provided. The topside and subsea high frequency modems 31 and 32 communicate over the same data transmission line 14 over which the topside and subsea low frequency modems 21 and 22 communicate. The data communication signals of both types of modems are thus transmitted over the same physical transmission line, such as a copper line or copper cable. Accordingly, the umbilical 13 does not need to be replaced when installing the subsea communication system 10.

The subsea communication system 10 further provides a topside frequency multiplexer 35 and a subsea frequency multiplexer 36. The topside frequency multiplexer 35 and the subsea frequency multiplexer 36 may be configured as diplexers that will be assumed in the following description. The subsea diplexer 36 may, for example, be part of the subsea signal distribution module 40, or may be coupled between the subsea signal distribution module 40 and the data transmission line 14.

The topside and the subsea high frequency modems 31 and 32 communicate by using signals having a frequency in a second frequency range that is higher than the first frequency range in which modems 21 and 22 communicate. The low frequency modems 21 and 22 may, for example, communicate with signals having frequencies in the range of 1 kH to about 5 kH, such as the 1200 and 2200 Hz signals mentioned above. The communication signals used by the high frequency modems 31 and 32 may, for example, lie within a range of about 50 kHz to about 10 MHz. Using communication signals of such frequencies has the advantage that higher data transfer rates may be achieved.

For example, the high frequency modems 31 and 32 may be adapted to perform a data communication using the OFDM scheme. In such a frequency division multiplexing scheme, a frequency band that is divided into several channels may be used. Each of the channels has a certain width in frequency space. The bandwidth of a channel may, for example, be between 3 and 5 kHz (e.g., about 4 kHz). In one embodiment of the high frequency modems 31 and 32, the high frequency modems 31 and 32 are adapted to use 100 to 300 (e.g., 200) channels having such a bandwidth. In the example of a 4 kHz channel bandwidth with 200 channels, the frequency band that is used for communication reaches up to 200 kHz. For allowing the low frequency communication of the low frequency modems 21 and 22 to continue (e.g., to not be disturbed), a certain number of the low frequency channels are blocked out and are not used for communication. For example, the first 24 channels may be blocked out. At a frequency bandwidth of 4 kHz per channel, this results in the frequency range of 0 to 96 kHz not being used by the high frequency modems 31 and 32. The frequency band used for communication thus extends from 96 kHz to 800 kHz. Using the OFDM communication scheme further has the advantage that if perturbations or interferences occur in one or more of the channels, data communication may continue via the other channels. Although the data transmission rate will slightly decrease, communication may be kept up and does not need to be terminated.

In the embodiment illustrated in FIG. 1, the first frequency range used by the modems 21 and 22 for communication and the second frequency range used by the modems 31 and 32 for communication do not overlap. While the modems 21 and 22 use only distinct data frequencies and potentially side bands in the first frequency range for communication, a whole frequency band lying within the second frequency range is used by the modems 31 and 32 for communication.

The topside and subsea diplexers 35 and 36 enable the simultaneous transmission of the communication signals of both types of modems over the single data transmission line 14. The diplexer 35 combines data communication signals received from the topside low frequency modem 21 and the topside high frequency modem 31 and transmits the combined communication signal on the data transmission line 14 to the diplexer 36. Vice versa, a data communication signal received by the diplexer 35 on the data transmission line 14 is split by the diplexer 35 into a low frequency communication signal (e.g., lying in the low frequency range) that is supplied to topside low frequency modem 21 and a high frequency communication signal (e.g., lying in the second frequency range) that is supplied to the topside high frequency modem 31. The subsea diplexer 36 coupled to the subsea low frequency modem 22 and subsea high frequency modem 32 operates correspondingly.

In the example of FIG. 1, the diplexers 35 and 36 are implemented as passive analog devices. This provides that the diplexers 35 and 36 do not perform separate splitting and combination acts, but are simply coupled between the respective two modems and the data transmission line 14 and perform an analog splitting and combination of data communication signals of the different frequency ranges.

Figure 2:
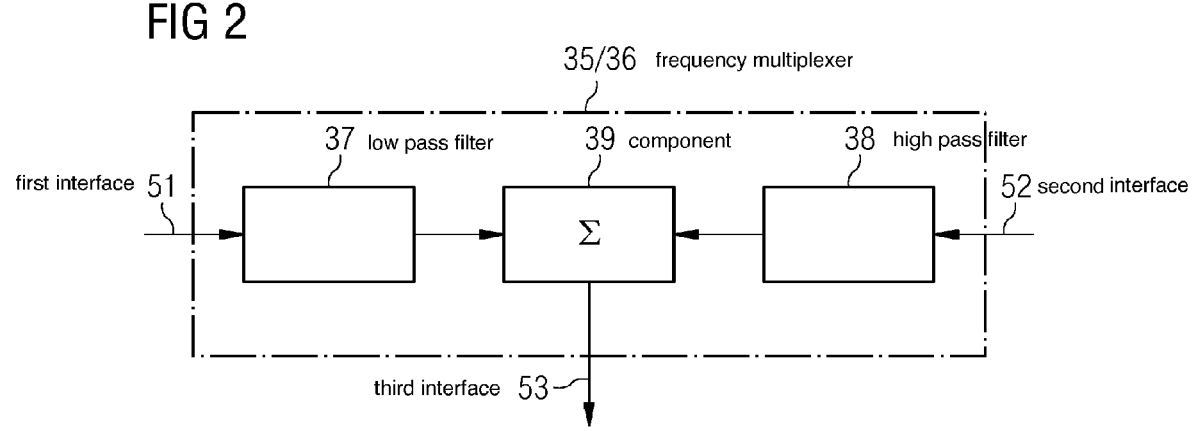
FIG. 2 is a schematic block diagram illustrating a configuration of a frequency multiplexer that may be used in embodiments of the subsea data communication system.

FIG. 2 illustrates a possible configuration of the topside and subsea diplexers 35 and 36. The diplexer includes a first interface 51 towards the respective low frequency modem and a second interface 52 towards the respective high frequency modem. Between the diplexer and the respective modem, a component that distributes the signal to further modems of the same type may be coupled. The diplexer includes a third interface 53 towards the data transmission line 14. Between the interfaces 51 and 53, a low pass or band pass filter 37 that passes frequencies of the first frequency range is coupled. In the configuration of the low frequency modems described above, low pass or band pass filter 37 may, for example, pass the 1200 and 2200 Hz signals.

Between the interfaces 52 and 53, the high pass or band pass filter 38 that is adapted to pass frequencies of the second frequency range is coupled. The high pass or band pass filter 38 may, for example, be adapted to pass the frequency band that is used by the high speed modems 31 and 32 for communication (e.g., the communication frequency band of the OFDM scheme).

The component 39 combines the signals received from the filters or splits the signal received from the data transmission line. The arrows shown in FIG. 2 illustrate a situation in which data communication signals are received from the high frequency and low frequency modems, so that unit 39 acts as a combiner. The unit 39 sums the signals and supplies the signals to the data transmission line 14 via the interface 53. In a situation in which a data communication signal is received from the data transmission line 14, the arrows are to be reversed. In the most simple configuration, the unit 39 may simply be a branching point that connects the data transmission line 14 with both filters 37 and filter 38.

Other configurations of the topside and subsea diplexers 35 and 36 may be provided. For example, any diplexer known in the art may be used.

In operation, data communication signals that are simultaneously received from the high frequency modem and the low frequency modem are multiplexed by the diplexer onto the data transmission line 14, with the diplexer on the other side of the data transmission line 14 demultiplexing the combined signal and supplying the demultiplexed data communication signals to the respective high frequency or low frequency modem. As the data communication signals of the different types of modems are transmitted in different frequency ranges, the data communication signals do not interfere and do not degrade the communication. Accordingly, with an existing umbilical and without the need to replace the topside and subsea low frequency modems, the high speed data transmission may be established between the topside control center 11 and the subsea installation 12.

The subsea installation 12 may be adapted to be deployed in a depth of more than 1000 m, 2000 m or even more than 3000 m. Accordingly, it is very costly to replace components of subsea installation 12. Using one or more of the present embodiments, a new component such as, for example, an MCM or a WCM that requires high data transmission rates without the need to replace an already installed component of the subsea installation 12 may be installed. The existing communication by the low frequency modems between the topside control center 11 and the subsea installation 12 continues to function, thereby avoiding the need to modify any of the previously installed subsea modules that communicate via the modems 22.

FIG. 1 illustrates one embodiment in which three subsea low frequency modems 22 and one subsea high frequency modem 32 are provided. Any other number of modems may be used (e.g., between 1 and 15 low frequency modems 22 and 1, 2 or more high frequency modems 32). The number is chosen in accordance with the number of subsea modules requiring modem communication.

In FIG. 1, the signal distribution module 40 may, for example, include a hub that is coupled to the subsea diplexer 36 and towards which the plural subsea low frequency modems 22 are coupled. A multi drop communication scheme may be used by the low frequency modems 21 and 22 for communication.

The subsea modems 22 and 32 may be part of the respective subsea module that makes use of the subsea modems 22 and 32 for data communication (e.g., the subsea modems 22 and 32 may be included in the enclosure of the respective module). The modem 32 may, for example, be part of a new control module that is installed subsea.

FIG. 1 illustrates different types of modems communicating in a first and a second frequency range. The communication signals are combined using diplexers. In other configurations, more than two different types of modems may be used, and a multiplexer may be used instead of a diplexer for combining/splitting more than two frequency ranges (e.g., three or more frequency ranges).

FIG. 3 illustrates a possible configuration of the subsea signal distribution module 40 in which several subsea high frequency modems 32 are coupled thereto, but which is otherwise similar to the configuration of FIG. 1. Accordingly, the descriptions given above equally apply to the embodiment illustrated in FIG. 3.

The subsea signal distribution module 40 includes the diplexer 36 that is coupled to the data transmission line 14 via the first interface (e.g., the interface 53 of FIG. 2). On the first interface 51 of the diplexer, over which communication signals in the first frequency range are transmitted, the diplexer 36 is coupled to the hub 42. The hub 42 distributes the communication signal to several connected subsea low frequency modems 22. In the embodiment illustrated in FIG. 3, the hub 42 simply includes a branching point in which the communication lines towards the different subsea low frequency modems 22 are joined. Other configurations of the hub 42 are considerable. Even though this rather simple configuration is used, the topside low frequency modem 21 may communicate with each of the subsea low frequency modems 22 (e.g., by using a multidrop method in which the topside modem 21 subsequently polls each of the subsea low frequency modems 22).

In the configuration of FIG. 3, the subsea signal distribution module 40 also includes an access multiplier 41. The access multiplier 41 is coupled to the diplexer 36 (e.g., via the second interface 52). The access multiplier 41 is further coupled to each of the subsea high frequency modems 32. The access multiplier 41 may, for example, use an internet protocol (IP) stack for aggregating traffic received from subsea high frequency modems 32 and transmit the aggregated traffic to the topside high frequency modem 31.

The data transmission may occur as outlined above (e.g., using an OFDM-scheme). The access multiplier 41 may act as a modem on each of the interfaces.

In other configurations, a communication between the topside high frequency modem 31 and each of the subsea high frequency modems 32 may occur without the use of an access multiplier 41 (e.g., by using other communications schemes, such as a multidrop scheme).

The use of a subsea signal distribution module 40 is optional, and only one subsea frequency multiplexer 36 may be provided towards which one or more subsea high/low frequency modems are coupled. In other configurations, the subsea frequency multiplexer 36 may be provided separate from the subsea signal distribution module 40. Only one of the access multiplier 41 and the hub 42 may be provided. In another embodiment, both of these units may be provided separate from each other (e.g., in respective subsea signal distribution modules).

FIG. 4 is a flow diagram illustrating one embodiment of a method that may be performed on any of the systems depicted and described with respect to FIGS. 1 and 3. In act 101, the topside low frequency modem transmits a communication signal. In act 102, the topside high frequency modem also transmits a communication signal. Acts 101 and 102 may be performed simultaneously.

Both communication signals are received at the topside frequency multiplexer, and in act 103, a frequency multiplexing is performed. In the frequency multiplexing, a communication signal is synthesized from both received communications signals, in which each of the received communication signals uses a different frequency spectrum that includes the modulated information. As mentioned above, the frequency multiplexing may be performed by a diplexer, such as the one illustrated and explained with respect to FIG. 2.

The multiplexer signal is transmitted over the data transmission line in act 104. Thus, both communication signals are transported over the same physical data transmission line in different frequency ranges so that the signals do not interfere with each other. The multiplexed signal is received at the subsea frequency multiplexer in act 105. The received signal is a demultiplexed in act 106. In the example of the diplexer shown in FIG. 2, each of the interfaces 51 and 52 is, for example, supplied with the demultiplexed communication signal in the respective frequency range.

In act 107, the communication signal in the low frequency range is transmitted to the subsea low frequency modem (e.g., via interface 51 of diplexer 36). In act 108, the communication signal in the high frequency range is transmitted to the subsea high frequency modem (e.g., via the interface 52 of the diplexer 36). The method then ends.

As shown, by using the same physical data transmission line, the method enables a communication between the low frequency topside and subsea modems and between the high frequency topside and subsea modems. A low frequency modem communication system may thus be upgraded by a communication system using an OFDM data transfer scheme without disturbing the operation of the low frequency modem communication system.

The communication signals may be analogue communication signals, and the acts illustrated in FIG. 4 may thus not be discrete acts, but may be performed continuously and essentially simultaneously (e.g., with only short delays being introduced by electric components of the topside and subsea frequency multiplexers, the wiring, and electronic components of the respective modems). In one embodiment, a digital processing of received data is performed, for example, in a frequency multiplexer or in the access multiplier or the like.

Embodiments disclosed herein may increase the bandwidth available for data transmission between a topside control center and a subsea installation without disturbing an existing communication system having a lower bandwidth. Both communication systems may co-exist. As both systems may communicate on the same umbilical without disturbing each other, the subsea installation may be upgraded stepwise (e.g., by exchanging modules including a low frequency modem or by adding modules). The communication link may be upgraded with the topside/subsea frequency multiplexer, which may be configured as passive units and thus require no power supply. Upgrading to the subsea communication system disclosed herein is thus relatively simple and cost efficient.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A subsea data communication system for providing a data communication between a topside control system and a subsea installation, wherein the topside control system comprises a topside low frequency modem adapted to perform a data communication in a first frequency range, and wherein the subsea installation comprises a subsea low frequency modem adapted to perform a data communication in the first frequency range, the topside low frequency modem being coupled to the subsea low frequency modem by a data transmission line of an umbilical that connects the topside control system to the subsea installation, the subsea data communication system comprising:
   a topside high frequency modem configured to be arranged at the topside control system and to perform a data communication in a second frequency range, the second frequency range being higher than the first frequency range;
   a subsea high frequency modem configured to be arranged at the subsea installation and to perform a data communication in the second frequency range;
   a topside frequency multiplexer configured to couple the topside low frequency modem and the topside high frequency modem to the data transmission line;
   a subsea frequency multiplexer configured to couple the subsea low frequency modem and the subsea high frequency modem to the data transmission line, wherein the topside frequency multiplexer and the subsea frequency multiplexer are configured so as to enable a simultaneous data communication between the topside low frequency modem and the subsea low frequency modem in the first frequency range and between the topside high frequency modem and the subsea high frequency modem in the second frequency range over the data transmission line,
   wherein each frequency multiplexer of the topside frequency multiplexer and the subsea frequency multiplexer comprises a first interface towards the respective low frequency modem of the topside low frequency modem and the subsea low frequency modem, a second interface towards the respective high frequency modem of the topside high frequency modem and the subsea high frequency modem and a third interface towards the data transmission line, the each of the frequency multiplexers further comprising:
   a low pass filter or a band pass filter configured to pass frequencies of the first frequency range and connected between the first interface and the third interface; and
   a high pass filter or a band pass filter configured to pass frequencies of the second frequency range and connected between the second interface and the third interface.

2. The subsea data communication system of claim 1, wherein the first frequency range and the second frequency range are configured such that the first frequency range and the second frequency range do not overlap.

3. The subsea data communication system of claim 2, wherein the topside frequency multiplexer and the subsea frequency multiplexer are diplexers.

4. The subsea data communication system of claim 3, wherein the diplexers are passive diplexers.

5. The subsea data communication system of claim 2, wherein each frequency multiplexer of the topside frequency multiplexer and the subsea frequency multiplexer is configured to multiplex data communication signals received from the respective low frequency modem of the topside low frequency modem and the subsea low frequency modem and the respective high frequency modem of the topside high frequency modem and the subsea high frequency modem onto the data transmission line and to demultiplex a communication signal received on the data transmission line into a communication signal in the first frequency range to be transmitted to the respective low frequency modem of the topside low frequency modem and the subsea low frequency modem and a communication signal in the second frequency range to be transmitted to the respective high frequency modem of the topside high frequency modem and the subsea high frequency modem.

6. The subsea data communication system of claim 2, wherein the topside high frequency modem and the subsea high frequency modem are configured to use a frequency band lying within a range of about 50 kHz to about 10 MHz for the data communication, the frequency band being divided into frequency multiplexed channels, each channel of the frequency multiplexed channels having a predetermined frequency bandwidth.

7. The subsea data communication system of claim 1, wherein the first frequency range lies below a threshold frequency, and the second frequency range lies above the threshold frequency, the threshold frequency being in a range of about 10 kHz to about 150 kHz.

8. The subsea data communication system of claim 1, wherein the first frequency range is a range of about 1 kHz to about 5 kHz, and the second frequency range is a range of about 50 kHz to about 10 MHz.

9. The subsea data communication system of claim 1, wherein the topside frequency multiplexer and the subsea frequency multiplexer are diplexers.

10. The subsea data communication system of claim 9, wherein the diplexers are passive diplexers.

11. The subsea data communication system of claim 1, wherein each frequency multiplexer of the topside frequency multiplexer and the subsea frequency multiplexer is configured to multiplex data communication signals received from the respective low frequency modem of the topside low frequency modem and the subsea low frequency modem and the respective high frequency modem of the topside high frequency modem and the subsea high frequency modem onto the data transmission line and to demultiplex a communication signal received on the data transmission line into a communication signal in the first frequency range to be transmitted to the respective low frequency modem of the topside low frequency modem and the subsea low frequency modem and a communication signal in the second frequency range to be transmitted to the respective high frequency modem of the topside high frequency modem and the subsea high frequency modem.

12. The subsea data communication system of claim 1, wherein the topside high frequency modem and the subsea high frequency modem are configured to perform a data communication with each other using an orthogonal frequency-division multiplexing scheme.

13. The subsea data communication system of claim 1, wherein the topside high frequency modem and the subsea high frequency modem are configured to use a frequency band lying within a range of about 50 kHz to about 10 MHz for the data communication, the frequency band being divided into frequency multiplexed channels, each channel of the frequency multiplexed channels having a predetermined frequency bandwidth.

14. The subsea data communication system of claim 1, further comprising a subsea signal distribution module coupled to the data transmission line, wherein the subsea low frequency modem and at least one further subsea low frequency modem are coupled to the subsea signal distribution module, the subsea low frequency modem and the at least one further subsea low frequency modem implementing a multi-drop communication scheme for enabling a data communication between the topside low frequency modem and each of the subsea low frequency modem and the at least one further subsea low frequency modem.

15. The subsea data communication system of claim 1, further comprising a subsea signal distribution module coupled to the data transmission line, wherein the subsea high frequency modem and at least one further subsea high frequency modem are coupled to the subsea signal distribution module, the subsea signal distribution module comprising an access multiplier configured to enable a point to point communication between the topside high frequency modem and each of the subsea high frequency modem and the at least one further subsea high frequency modem.

16. The subsea data communication system of claim 1, wherein the subsea high frequency modem is connected to a well control module or a manifold control module, or is part of the well control module or the manifold control module, the subsea high frequency modem being configured to provide data received over the data transmission line to the well control module or the manifold control module, respectively.

17. A method of performing a data communication between a topside control system and a subsea installation, wherein the topside control system comprises a topside low frequency modem, and wherein the subsea installation comprises a subsea low frequency modem, the topside low frequency modem being coupled to the subsea low frequency modem by a data transmission line of an umbilical that connects the topside control system to the subsea installation, the method comprising:

performing a data communication between the topside low frequency modem and the subsea low frequency modem in a first frequency range;

performing a data communication between a topside high frequency modem arranged at the topside control system and a subsea high frequency modem arranged at the subsea installation in a second frequency range, the second frequency range being higher than the first frequency range, wherein the topside low frequency modem and the topside high frequency modem are coupled to the data transmission line by a topside frequency multiplexer, and wherein the subsea low frequency modem and the subsea high frequency modem are coupled to the data transmission line by a subsea frequency multiplexer, wherein each frequency multiplexer of the topside frequency multiplexer and the subsea frequency multiplexer comprises a first interface towards the respective low frequency modem of the topside low frequency modem and the subsea low frequency modem, a second interface towards the respective high frequency modem of the topside high frequency modem and the subsea high frequency modem and a third interface towards the data transmission line, each of the frequency multiplexers further comprising a low pass filter or a band pass filter configured to pass frequencies of the first frequency range and connected between the first interface and the third interface, each of the frequency multiplexers further comprising a high pass filter or a band pass filter configured to pass frequencies of the second frequency range and connected between the second interface and the third interface; and performing a frequency multiplexing and demultiplexing by each of the topside frequency multiplexer and the subsea frequency multiplexer so as to enable a simultaneous data communication between the topside low frequency modem and the subsea low frequency modem in the first frequency range and between the topside high frequency modem and the subsea high frequency modem in the second frequency range over the data transmission line.

18. The method of claim 17, wherein the method is performed by a subsea communication system.

* * * * *